United States Patent
Lobo et al.

(10) Patent No.: US 7,426,485 B1
(45) Date of Patent: Sep. 16, 2008

(54) SYSTEM, METHOD, AND COMPUTER PROGRAM PRODUCT FOR BROKERING DATA PROCESSING SERVICE LICENSES

(75) Inventors: Sanjay P. Lobo, Allen, TX (US); Jeff B. Cotten, Addison, TX (US); Jeffrey L. Wacker, Plano, TX (US)

(73) Assignee: Electronic Data Systems Corporation, Plano, TX (US)

( * ) Notice: Subject to any disclaimer, the term of this patent is extended or adjusted under 35 U.S.C. 154(b) by 696 days.

(21) Appl. No.: 10/940,425

(22) Filed: Sep. 14, 2004

(51) Int. Cl.
 *G06Q 10/00* (2006.01)
(52) U.S. Cl. ...................................... 705/28
(58) Field of Classification Search ........................ None
 See application file for complete search history.

(56) References Cited

U.S. PATENT DOCUMENTS

| 6,519,571 | B1 * | 2/2003 | Guheen et al. ................ 705/14 |
| 7,139,999 | B2 * | 11/2006 | Bowman-Amuah ......... 717/101 |
| 7,295,990 | B1 * | 11/2007 | Braumoeller et al. .......... 705/7 |
| 2003/0088516 | A1 * | 5/2003 | Remer et al. .................. 705/59 |

* cited by examiner

*Primary Examiner*—Pramila Parthasarathy
(74) *Attorney, Agent, or Firm*—Munck Carter, P.C.

(57) ABSTRACT

A system, method, and computer program product for brokering data processing service licenses, including allocation and provisioning of the licenses. Preferred embodiments includes a functional architecture for services license brokerage, a license allocation process and a license provisioning process, a service license scheduler, and a definition of metadata for the service license brokerage.

15 Claims, 6 Drawing Sheets

SYSTEM, METHOD, AND COMPUTER PROGRAM PRODUCT FOR BROKERING DATA PROCESSING SERVICE LICENSES

CROSS-REFERENCE TO RELATED APPLICATIONS

The present application may include some text and figures in common with, but is otherwise unrelated to, the following United States patent applications, all of which are hereby incorporated by reference: Commonly assigned patent application Ser. No. 10/878,722 for "System, Method, and Computer Program Product for Brokering Online Services and Applications", filed 28 Jun. 2004, commonly assigned patent application Ser. No. 10/941,033 for "System, Method, and Computer Program Product for Client-Service Provider and Service Provider-Vendor Agreement Translation, Configuration, and Monitoring", filed concurrently herewith, commonly assigned patent application Ser. No. 10/941,038 for "System, Method, and Computer Program Product for Brokering Data Processing Services", filed concurrently herewith, and commonly assigned patent application Ser. No. 10/940,424 for "System, Method, and Computer Program Product for Automated Categorization of Data Processing Services and Components", filed concurrently herewith.

TECHNICAL FIELD OF THE INVENTION

The present invention is directed, in general, to providing web- and internet-based licensing services.

BACKGROUND OF THE INVENTION

As a utility-services-based computing model used in the marketplace, the traditional licensing model of software/content components becomes obsolete. The use of services can often be enabled by one or more application components. The complexity of assembling, allocating, and provisioning of the associated licenses poses a major issue for service providers and service brokers. Some of the related issues include:

1. For application software, the current license model is very restricted to end-user license, enterprise site license, etc. This license model has not been able to extend to feature-based licensing to enable a utility licensing model (ULM). The financial and business drivers for software vendors has been a deterrent to offering this new licensing model.

2. As enterprises are looking for services to solve their business need, they are looking for standard or custom solution packs (industry, BPO packs) instead of individual applications to manage their business. There is a need for a consolidated service licensing model.

3. From a new application/solution prospective, as composite applications are developed, the associated composite license agreement must be assembled and provisioned.

4. In addition, current licensing models are not capable of managing the allocation of licenses based on usage forecast.

5. Existing software licenses need a migration model to move to a utility-licensing model.

The impact of these problems and others is reduced customer satisfaction and decreased service excellence.

There is, therefore, a need in the art for a system, process and computer program product for brokering data processing service licenses.

SUMMARY OF THE INVENTION

Various embodiments provide a system, method, and computer program product for brokering data processing service licenses, including allocation and provisioning of the licenses. Preferred embodiments includes a functional architecture for services license brokerage, a license allocation process and a license provisioning process, a service license scheduler, and a definition of metadata for the service license brokerage.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

Various embodiments provide a system, method, and computer program product for brokering data processing service licenses, including allocation and provisioning of the licenses. Preferred embodiments includes a functional architecture for services license brokerage, a license allocation process and a license provisioning process, a service license scheduler, and a definition of metadata for the service license brokerage.

Figure 1:
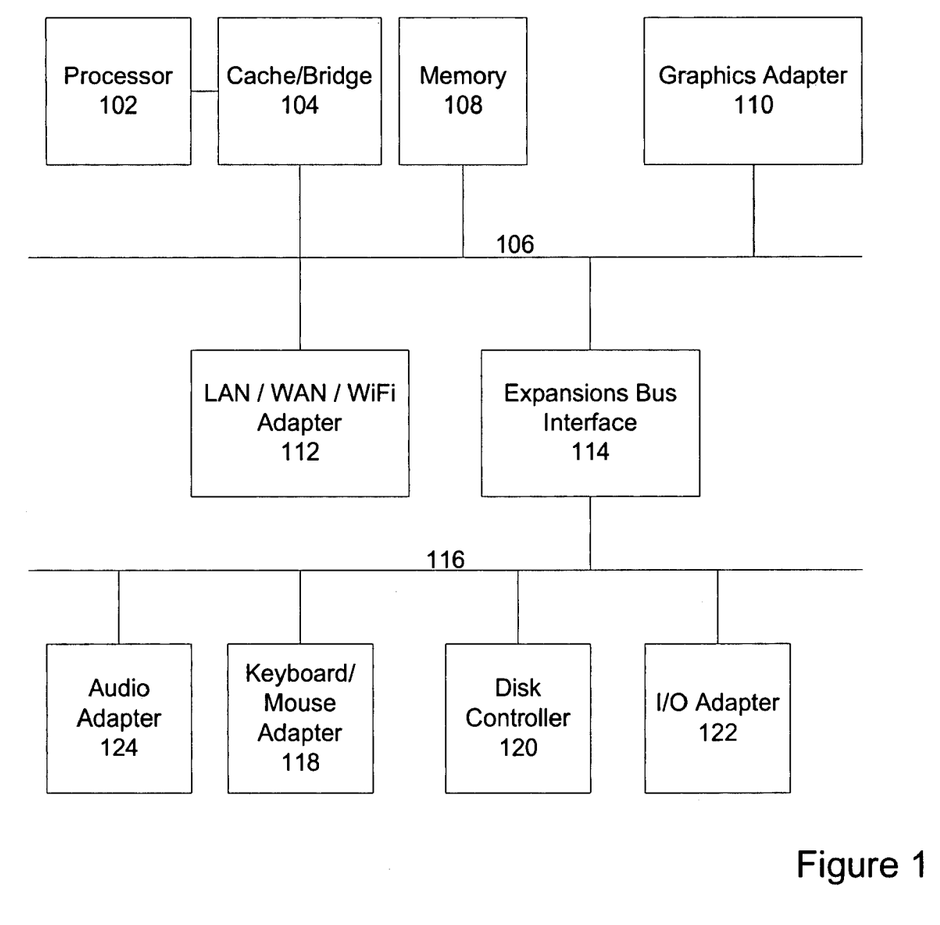
FIG. 1 depicts a block diagram of a data processing system in which an embodiment of the present invention can be implemented.

FIG. 1 depicts a block diagram of a data processing system in which a preferred embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present invention.

A data processing system in accordance with a preferred embodiment of the present invention includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present invention as described.

Figure 2:
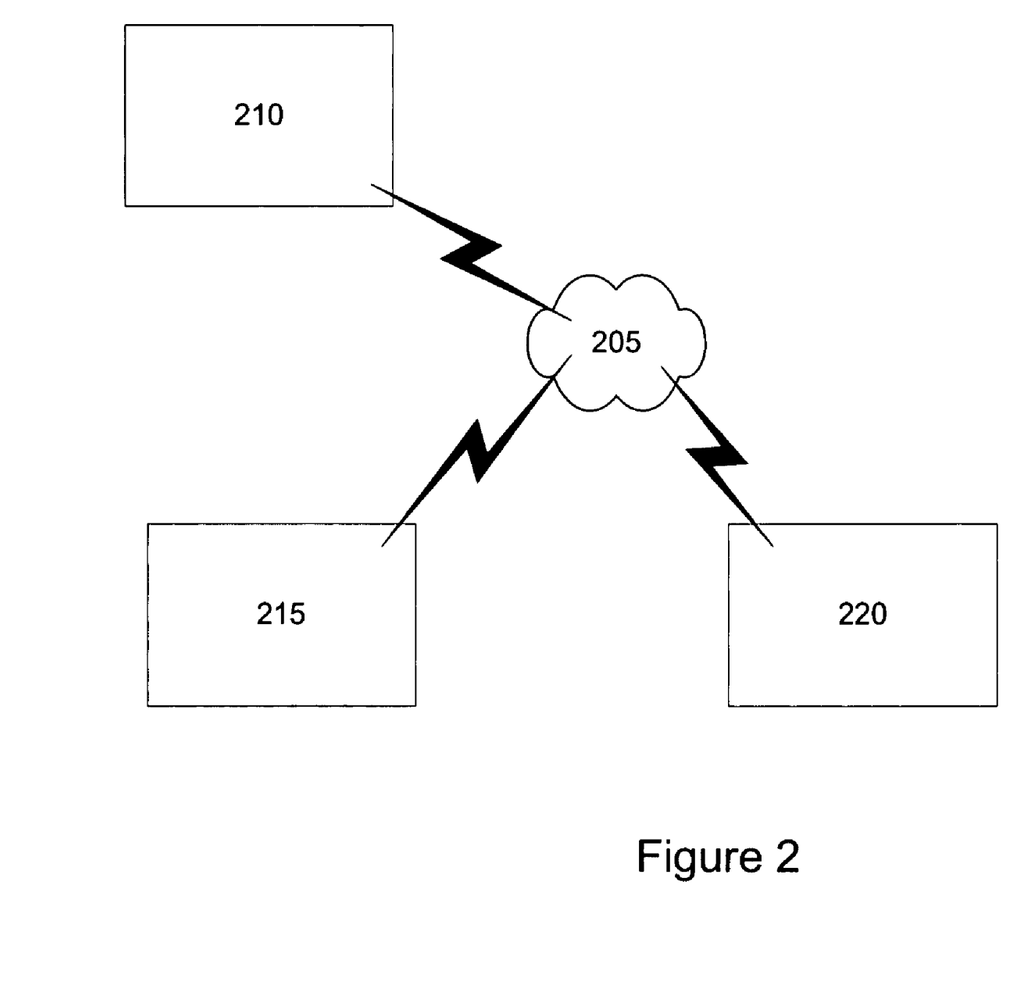
FIG. 2 depicts a block diagram of a data processing system network in accordance with a preferred embodiment.

FIG. 2 depicts a block diagram of a data processing system network in which an embodiment of the present invention can be implemented. In this figure, network 205 is any known type of computer network, including private networks or public networks such as the internet. While network 205 is shown in only one instance here; as known to those of skill in the art, network 205 can be implemented in multiple separate networks, or in the same public or private network system. Of course, any data or network communication described herein can be implemented using any known data communications means, such as via telephone modem, xDSL, fiber optic, wireless, etc., or public or private networks. These communications will include data pertaining to purchases and refunds, taxes, and other functions, as known in the art and/or as specifically described below.

Server 210 is shown communicating client systems 215/220 via network 255. Server system 210 is a data processing system server, configured to communicate with multiple different client systems, including client systems 215/220 and others.

It is understood that client systems 215/220 and server system 210 may be co-located or placed at different locations, or be otherwise structured as known to those of skill in the art, so long as they are capable of together performing the functions described and claimed herein.

Various embodiments provide a system, method, and computer program product for brokering data processing service licenses, including allocation and provisioning of the licenses. Preferred embodiments includes a functional architecture for services license brokerage, a license allocation process and a license provisioning process, a service license scheduler, and a definition of metadata for the service license brokerage.

As used herein, the term "Component Providers" or refers to providers of hardware, software, compute, storage, network, and content, all of which can be generically referred to as "data processing system services" or simply "services." In addition, in at least some embodiments, the component providers own the licenses of their components until they have been subscribed by or assigned to the consumer. Thus the collaboration of the component provider to provide services through a brokerage facility is important for the management of these licenses.

Figure 3:
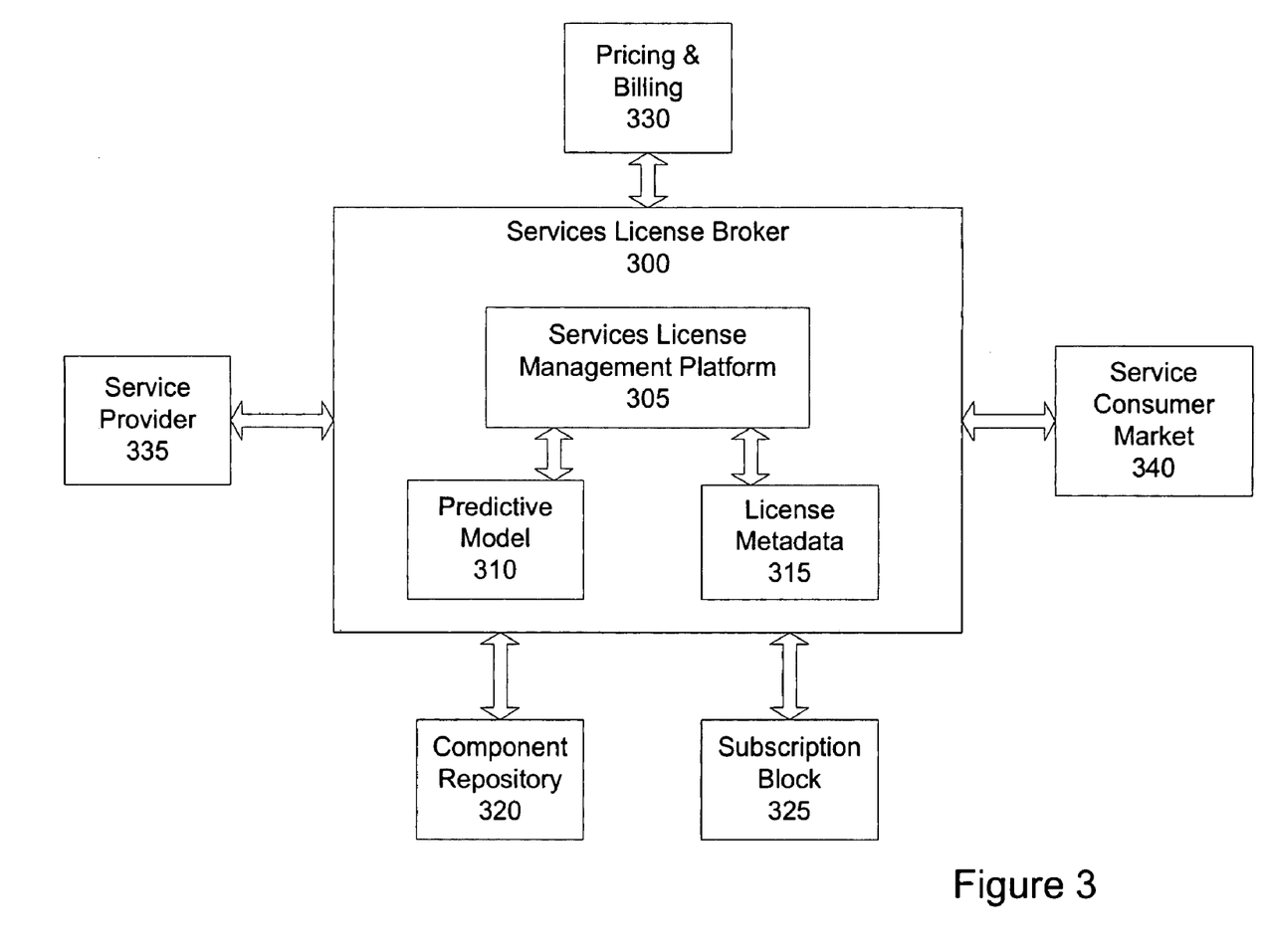
FIG. 3 depicts a block diagram of a functional architecture for a services license brokerage in accordance with a preferred embodiment.

FIG. 3 depicts a block diagram of a functional architecture for a services license brokerage 300 in accordance with a preferred embodiment. The service provider 335 has a user interface to submit and manage licenses for the services they are providing to the services license broker 300. This interface can be a portal interface or a set of application interfaces (e.g. Web Service, etc.) to be integrated with the provider's system. The allocation process of the licenses has been described below.

There is also the interface to the services license broker 300 for the service consumer (or marketplace) 340. This interface is also a set of application interfaces (e.g. web services, etc.). This interface is used to check service inventory, check-in and check-out service licenses, reserve license blocks, etc.

The services license broker 300 has three major components—a services license management platform 305, predictive modeling data 310, and the license metadata 315. The services license management platform 305 is a framework to provide management functions for check-in and check-out licenses, services inventory check, service license allocation, service license provisioning, service license prioritization, license order management, and license contracts.

The license metadata 315 stores the service licenses, service license contracts, and other related elements.

The predictive model data 310 provides the services license broker platform 305 the ability to forecast and manage peeks and valleys of the amount of the service license request by the consumer.

The three external interfaces to the Services license brokerage are the Component Repository 320, Subscription Block 325, and Pricing and Billing 330.

Figure 4:
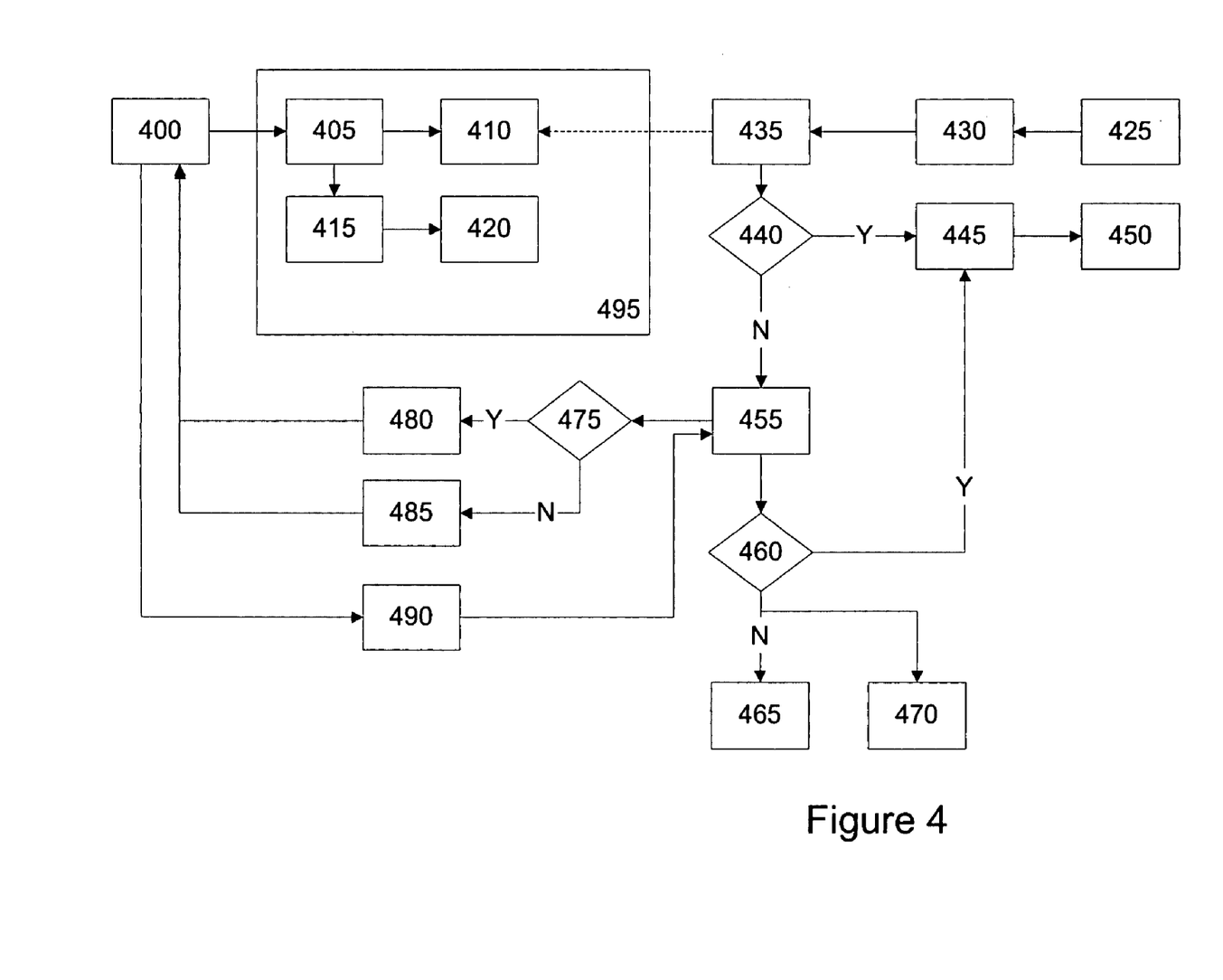
FIG. 4 depicts a block diagram of the functional process architecture for a license allocation process and a license provisioning process in accordance with preferred embodiments.

FIG. 4 depicts a block diagram of the functional process architecture for a license allocation process 495 and a license provisioning process in accordance with preferred embodiments.

The license allocation process enables component providers 400 to provide a block of licenses for the usage of their components on a on-request basis. It also assists them to proactively respond to license needs based on predictive models. The process starts with a license brokerage request interface 405 that a service component provider 400 accesses. They will be provided a list of components in the catalog that they own, which is stored in a service license block 410. Included in the service license block is all the associated license data, including the total number of licenses, number of license used, etc. During this process the provider level agreement (PLA) 415 is updated and stored in the service contract repository 420. The component provider 400 can monitor the license blocks 410 via a license dashboard as part of this provider interface.

The license provisioning process deals with the real-time response to the demand of licenses for components/services and the dynamic provisioning of these licenses. Traditionally, these licenses have been tied to the services contract with the providers that have been managed manually. The license provisioning process is an automated process that is integrated with the several functional areas—metering, billing, monitoring, etc.

The process begins when a consumer 425 selects a component/service from the catalog 430. The order management process performs the check on the component/service inventory 435 by checking the available service license block 410. If available 440, the license brokerage reserves or "checks out" the request license block 445 and proceeds with the provisioning of the service process 450.

In the event that the licenses are unavailable 440, the order request is posted to the license order engine 455.

There are two conditions associated with this request. One is related to the immediate nature of the request that the consumer just made and is expecting that it fulfilled. The second condition is related to the reorder point pre-determined by the brokerage. The priority is managed by setting the priority of the request. This request is then forwarded to the preferred component provider for that component/service. That is, if it is an immediate order 475, the priority is set to high 480, else the order priority is set to medium 485 (or low, or to a vendor-specified level). The request is sent to component provider 400. Preferably, the process up to this point, at least, is automated.

The component provider 400 upon receipt of this request will use the license allocation process 495 to fulfill the request and return the license order status 490 to the license order engine 455.

If the preferred component/service provider can fulfill the order request 460, the license brokerage reserves or "checks out" the request license block 445 and proceeds with the provisioning of the service process 450.

In the case that the preferred component/service provider is unable to fulfill the order request 460 there are two actions that take place. One, the provider level agreement (PLA) with the component/service provider will be enforced for non-compliance 470. The second is the component/service order request will be positioned for bidding with secondary component/service providers 465. This is to guarantee the component/service to the consumer.

Figure 5:
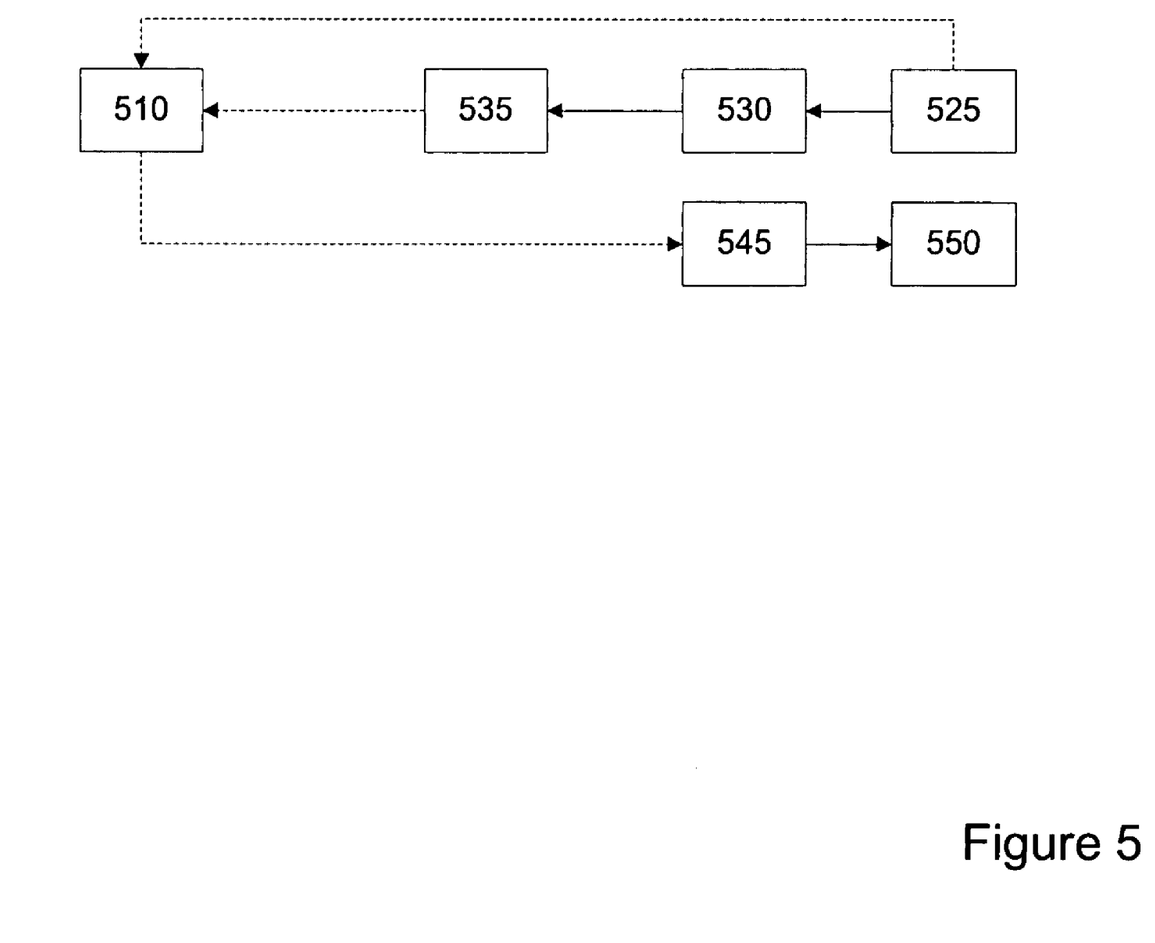
FIG. 5 illustrates a functional process architecture for the check-in and check-out of licenses for services, in accordance with a preferred embodiment.

FIG. 5 illustrates a functional process architecture for the check-in and check-out of licenses for services. This figure shows that when a license from the license block 510 is requested from the catalog 530 by a consumer 525, the license inventory is checked 535. If the requested license is available, then they are checked-out 545 and provisioned 550 to the consumer 525.

The checked-out licenses are reserved until they are returned when the consumer 525 checks them in to service licensing block 510, making them again available in the license inventory pool.

Figure 6:
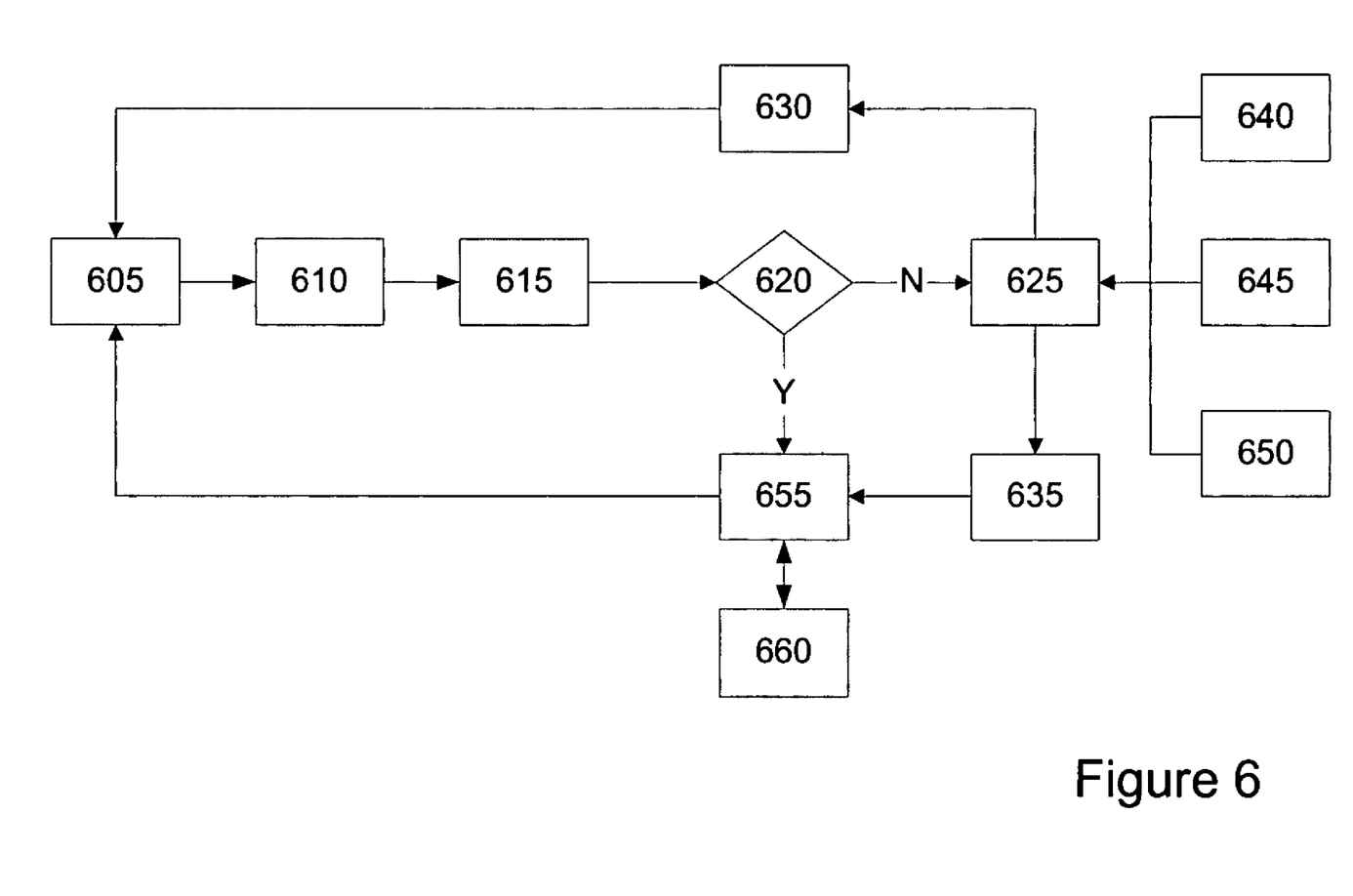

FIG. 6 illustrates a functional process for scheduling services for immediate and future needs, in accordance with a preferred embodiment. Once the consumer 605 accesses the services catalog 610 and orders the service needed 615, they will be required to select 620 whether they need the service immediately (default), or not, as they need the schedule the service in the future.

If the immediate service is selected the service request will be sent to the service provisioning engine 655 and all the appropriate checks to provide the service to the end consumer from services repository 660.

In the event that the service is tagged as a future schedule service 620, the service scheduler 625 will request the schedule elements (date, time, etc.). It will then use the consumer profile data 640 to determine the priority to schedule and deliver the service. The services scheduler will also uses the license brokerage 645 to determine the availability of the service licenses. If there are not enough licenses that can be scheduled at the requested time then an overflow license request is made to the overflow service order engine 650 to ask the service provider to fulfill the request.

Once the request to schedule service license is completed a notification is sent to the consumer. The services scheduler maintains requests and schedules in real-time.

When the services scheduler determines that the pre-scheduled service is due for delivery 635, the service request will be sent to the service provisioning engine 655 and all the appropriate checks to provide the service to the end consumer from services repository 660.

The metadata for the service license brokerage and the appropriate syntax for usage of this metadata, according to a preferred embodiment, is described below. The metadata can be centralized or a collection of federated metadata that are distributed. The metadata elements are:

Service Component License Identifier
Service Component Name
Service Component Description
Service Component Provider Identifier
Service Component Location (URI)
Service Component License Usage Domains (Geographic)
Service Component License Start Date
Service Component License End Date
Service Component License Unit Cost
Service Component License Permission
Service Component License Requires (other Licensed Components)
Service Component License Priority Level (priority indicators)
Service Component License Provisioning Duration (Limited, Perpetual)

The syntax for the sample implementation of the metadata has been shown below. The description file (DTD) for the tags is registered and provided via a URL. The slb tag segment identifies the tag as the Service License Brokerage tag.

<slb:Service-Component-License-ID=" ">
<slb:Service-Component-Name=" ">

```
<slb:Service-Component-Description=" ">
<slb:Service-Component-Provider-ID=" ">
<slb:Service-Component-Location=" ">
<slb:Service-Component-License-Usage-Domains=" ">
...
```

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of the disclosed systems may conform to any of the various current implementations and practices known in the art.

It is important to note that while the present invention has been described in the context of a fully functional system, those skilled in the art will appreciate that at least portions of the mechanism of the present invention are capable of being distributed in the form of a instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for data processing service licenses, comprising:
    receiving, from a user over a network, a request for at least one data processing service license;
    determining if the at least one data processing service license is available in a license inventory;
    if the at least one data processing service license is available in the license inventory, then assigning the at least one data processing service license to the user, and updating the license inventory;
    if the at least one data processing service license is not available in the license inventory, then
    requesting the at least one data processing system service license from the at least one provider,
    receiving the at least one data processing system service license from the at least one provider,
    assigning the at least one data processing service license to the user, and updating the license inventory;
    using predictive modeling to maintain data processing service licenses in the license inventory; and requesting the at least one data processing system service license further comprising if the at least one data processing service license is not available from a first provider, then requesting the at least one data processing system service license from a second provider.

2. The method of claim 1, further comprising billing the user for the at least one data processing service license.

3. The method of claim 1, further comprising sending, for display to the user, a list of data processing system services that the user can request.

4. The method of claim 1, further comprising determining a priority level for the request to the provider.

5. The method of claim 1, further comprising crediting the provider for each data processing service license assigned to a user.

6. A data processing system comprising a processor and accessible memory, the data processing system configured to perform the steps of:
    receiving, from a user over a network, a request for at least one data processing service license;
    determining if the at least one data processing service license is available in a license inventory;
    if the at least one data processing service license is available in the license inventory,
    assigning the at least one data processing service license to the user, and updating the license inventory;
    if the at least one data processing service license is not available in the license inventory,
    requesting the at least one data processing system service license from the at least one provider,
    receiving the at least one data processing system service license from the at least one provider,
    assigning the at least one data processing service license to the user, and updating the license inventory;
    using predictive modeling to maintain data processing service licenses in the license inventory; and requesting the at least one data processing system service license further configured to perform the step of requesting the at least one data processing system service license from a second provider if the at least one data processing service license is not available from a first provider.

7. The data processing system of claim 6, wherein the data processing system is further configured to perform the step of comprising billing the user for the at least one data processing service license.

8. The data processing system of claim 6, wherein the data processing system is further configured to perform the step of sending, for display to the user, a list of data processing system services that the user can request.

9. The data processing system of claim 6, wherein the data processing system is further configured to perform the step of determining a priority level for the request to the provider.

10. The data processing system of claim 6, wherein the data processing system is further configured to perform the step of crediting the provider for each data processing service license assigned to a user.

11. A computer program product tangibly embodied in a machine-readable medium, comprising:
    instructions for receiving, from a user over a network, a request for at least one data processing service license;
    instructions for determining if the at least one data processing service license is available in a license inventory;
    instructions for, if the at least one data processing service license is available in the license inventory, assigning the at least one data processing service license to the user, and updating the license inventory;
    instructions for, if the at least one data processing service license is not available in the license inventory, requesting the at least one data processing system service license from the at least one provider, receiving the at least one data processing system service license from the at least one provider, assigning the at least one data processing service license to the user, and updating the license inventory;

instructions for using predictive modeling to maintain data processing service licenses in the license inventory; and instructions for requesting the at least one data processing system service license further comprising instructions for requesting the at least one data processing system service license from a second provider if the at least one data processing service license is not available from a first provider.

12. The computer program product of claim 11, further comprising instructions for billing the user for the at least one data processing service license.

13. The computer program product of claim 11, further comprising instructions for sending, for display to the user, a list of data processing system services that the user can request.

14. The computer program product of claim 11, further comprising instructions for determining a priority level for the request to the provider.

15. The computer program product of claim 11, further comprising instructions for crediting the provider for each data processing service license assigned to a user.

* * * * *